(12) United States Patent
Cheng

(10) Patent No.: US 6,688,521 B2
(45) Date of Patent: Feb. 10, 2004

(54) CARD READER SEPARABLE FROM HOST MACHINE

(75) Inventor: Tse Cheng, Hsinchu (TW)

(73) Assignee: Kingbyte Information Corp. (TW)

( * ) Notice: Subject to any disclaimer, the term of this patent is extended or adjusted under 35 U.S.C. 154(b) by 0 days.

(21) Appl. No.: 10/187,122

(22) Filed: Jul. 1, 2002

(65) Prior Publication Data

US 2004/0000588 A1 Jan. 1, 2004

(51) Int. Cl.[7] .................................................. G06K 7/08
(52) U.S. Cl. ...................... 235/451; 235/382; 235/380; 235/492
(58) Field of Search ............................... 235/451, 382, 235/380, 492

(56) References Cited

U.S. PATENT DOCUMENTS 6,179,649 B1 * 1/2001 An .............................. 439/500
6,312,175 B1 * 11/2001 Lum ............................ 400/472
6,434,648 B1 * 8/2002 Assour et al. ................ 710/305
6,438,638 B1 * 8/2002 Jones et al. .................. 710/301
6,449,438 B1 * 9/2002 Gennetten ..................... 396/300
6,484,259 B1 * 11/2002 Barlow ........................ 713/159
6,547,135 B2 * 4/2003 Solirenne et al. ............ 235/382

* cited by examiner

Primary Examiner—Thien M. Le
Assistant Examiner—Allyson Sanders
(74) Attorney, Agent, or Firm—Mathews, Collins, Shepherd & McKay, P.A.

(57) ABSTRACT

A card reader separable from a host machine is provided. The card reader includes a main body having a first card-placing slot for placing therein a first memory card, a connection port mounted on the main body for separably connecting with a plug, and a carrying rack mounted inside the host machine for mounting thereon the plug and separable carrying the main body so that the card reader can be separated from the host machine. The mobile card reader provided here is able to be used in both ways of being built-in the host machine and being connected from the outside.

12 Claims, 5 Drawing Sheets

CARD READER SEPARABLE FROM HOST MACHINE

FIELD OF THE INVENTION

The present invention is related to a mobile card reader, and more particularly, to a card reader separable from a host machine, which includes a main body, a connection port, and a carrying rack. The carrying rack is mounted inside the host machine for mounting thereon a plug and separably carrying the main body. The mobile card reader provided in the present invention therefore has both features of being built-in the hot machine and being connected with the host machine from the outside.

BACKGROUND OF THE INVENTION

The conventional card readers are mostly connected with the host machine from the outside via an inseparable able line which transmits the information. One end of the cable line is fixedly connected with the card reader, the other end is connected with the plug for an universal serial bus (USB). When the card reader is needed, the user has to plug the USB plug into the USB connection port on the desktop computer or notebook. In such way, not only the extra action of connecting the lines is needed, but also the space of tabletop is taken since the card reader is connected from the outside.

In the present, the capacity of memory card has been increased to 128 MB~1GB from 8~64 MB. The price has continuously gone down from the high price as well. Therefore, the card reader built-in the host machine is available in the market. However, since the card reader is not so popularized as the 3.5" floppy disk drive, it will be very inconvenient for the user if the computer does not have the card reader built-in the host machine.

Thus, how to broaden the using range of card reader and overcome the limit of being built-in the host machine or being connected from the outside have become the main purpose of the present invention. In order to improve the drawbacks in the prior art, a mobile card reader is provided. Not only the limit of being built-in the host machine or being connected from the outside has been overcome, but also the using range is broadened.

SUMMARY OF THE INVENTION

The main purpose of the present invention is to provide a card reader which is separable from a host machine through a carrying rack mounted inside the host machine.

It is another object of the present invention to provide a card reader which is separable from a host machine by mounting a USB connection port on the card reader.

It is another object of the present invention to provide a card reader which is connected with the main machine from the outside by using the extended USB plug (extension cable terminal) to connected with the USB connection port on the card reader.

According to one aspect of the present invention, a card reader separable from a host machine includes a main body having a first card-placing slot for placing therein a first memory card, a connection port mounted on the main body for separably connecting with a plug, and a carrying rack mounted inside the host machine for mounting thereon the plug and separably carrying the main body so that the card reader can be separated from the host machine.

In accordance with the present invention, the connection port is one of a group selected from a A-type port of a universal serial bus (USB), a parallel port, a firewire of IEEE 1394 (Institute of Electrical and Electronic Engineers), and a specific interface.

Preferably, the plug is one of an extension cable terminal and a plug fixed on a printed circuit board.

Preferably, the printed circuit board is mounted inside the carrying rack and electrically connected with a USB (universal serial bus) connector of a mother board for reading the first memory card.

Preferably, the carrying rack includes a carrying room for receiving therein the main body.

Preferably, the carrying rack further includes a retaining device for retaining therewih the main body and an ejector for ejecting the main body.

Preferably, the carrying rack further includes an arcuate indent through which a user's digit can insert to clip out the main body.

Preferably, the card reader is electrically connected with one of a desktop computer and a notebook via the extension cable terminal.

Preferably, the first memory card is one of a compact flash card and a micro drive card.

Preferably, the main body further includes a second card-placing slot for reading a smart media card.

Preferably, the main body further includes a third card-placing slot for reading one of a secure digital card and a multimedia card.

Preferably, the main body further includes a fourth card-placing slot for reading a memory stick.

Preferably, the card reader is a writer and includes a light-emitting diode (LED) for showing an operation status of the card reader.

Preferably, the carrying rack has a standard size of a 3.5" floppy disk drive to be built-in the host machine.

According to another aspect of the present invention, a card reader separable from a host machine includes a main body having a first card-placing slot for placing therein a first memory card, and a connection port mounted on the main body for separably connecting with a plug electrically connected to the host machine so that the card reader can separated from the host machine.

Preferably, the card reader further includes a carrying rack mounted inside the host machine for mounting the plug and separably carrying the main body of the card reader.

The foregoing and other features and advantages of the present invention will be more clearly understood through the following descriptions with reference to the drawings, wherein:

DETAILED DESCRIPTION OF THE PREFERRED EMBODIMENT

Figure 1:
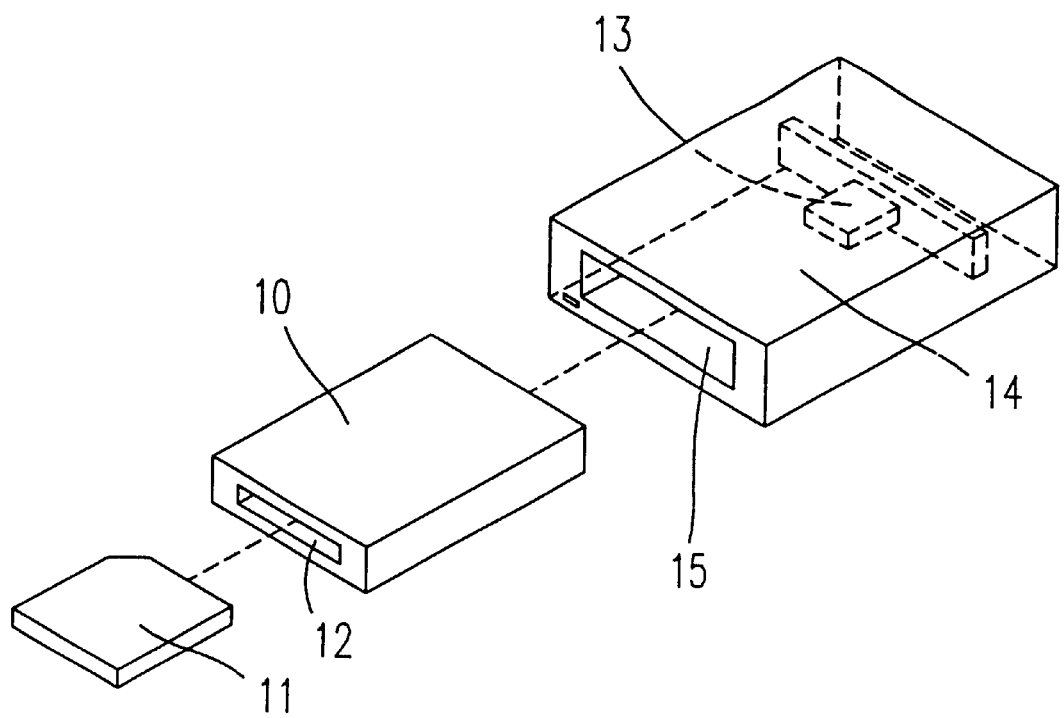
FIG. 1 is a three-dimensional diagram illustrating the mobile card reader which is built-in the host machine according to a first preferred embodiment of the present invention.

The present invention will now described more specifically with reference to the following embodiments. Please refer to FIG. 1. FIG. 1 is a three-dimensional diagram illustrating the mobile card reader which is built-in the host machine according to a first preferred embodiment of the present invention. The main body 10 of the card reader is movable and able to be separate from the host machine 20. The card reader includes a main body 10, a connection port 21, and a carrying rack 14. The main body 10 has a first card-placing slot 12 for placing therein a first memory card 11. The connection port 21 is mounted on the main body 10 for separably connecting with a plug 13. The carrying rack 14 is mounted inside the host machine 20 for mounting thereon the plug 13 and separably carrying the main body 10 so that the main body 10 of the card reader can be separated from the host machine 20.

Figure 2:
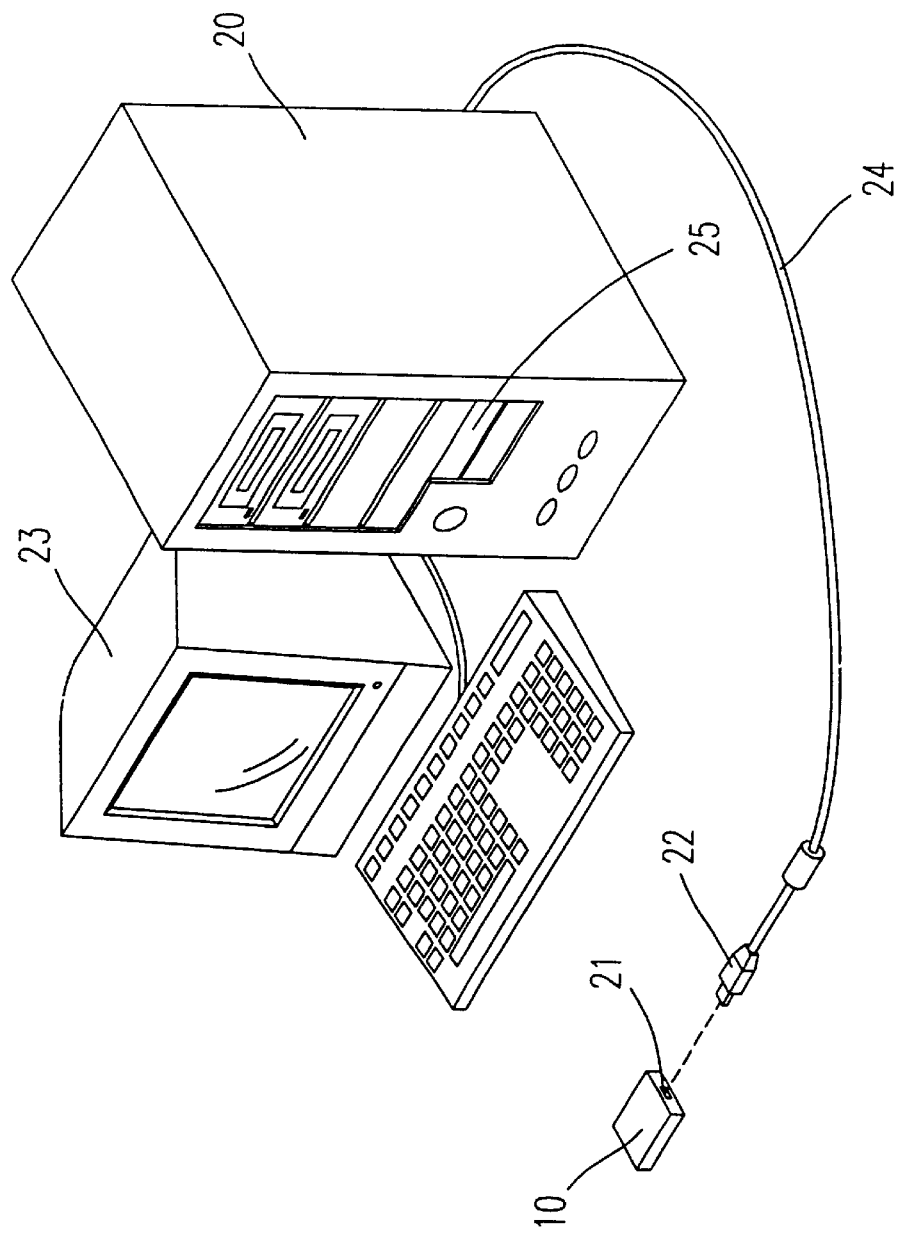
FIG. 2 is a diagram illustrating the mobile card reader connected with the host machine from the outside according to a second preferred embodiment of the present invention.
Figure 3:
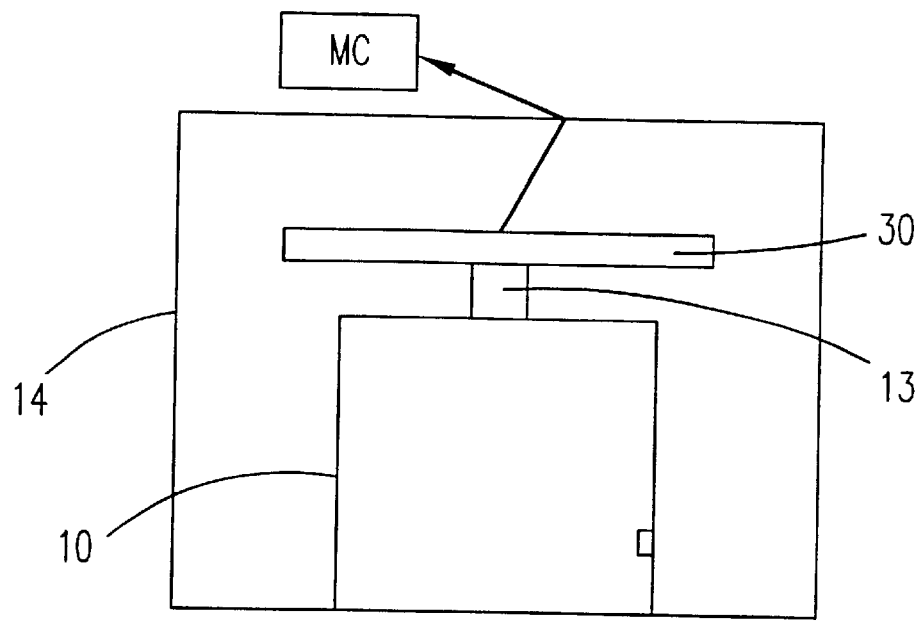
FIG. 3 is a top view illustrating the internal structure of the carrying rack according to a preferred embodiment of the present invention.

Please refer to FIG. 2. FIG. 2 is a diagram illustrating the mobile card reader connected with the host machine from the outside, which is another operation style changed from FIG. 1 according to a second preferred embodiment of the present invention. The plug 13 in FIG. 1 can be changed into the extension cable terminal 22 as shown in FIG. 2. Please refer to FIG. 3. FIG. 3 is a top view illustrating the internal structure of the carrying rack according to a preferred embodiment of the present invention. The plug 13 in FIG. 1 can also be changed into the printed circuit board (PCB) 30 as shown in FIG. 3. The connection port 21 on the main body 10 is one of a group selected from a A-type port of a universal serial bus (USB), a parallel port, a firewire of IEEE 1394 (Institute of Electrical and Electronic Engineers), and a specific interface. The printed circuit board 30 is mounted inside the carrying rack 14 and electrically connected with the USB (universal serial bus) connector of the mother board (MC) for reading the first memory card. The carrying rack 14 includes a carrying room for receiving therein the main body 10.

Figure 4:
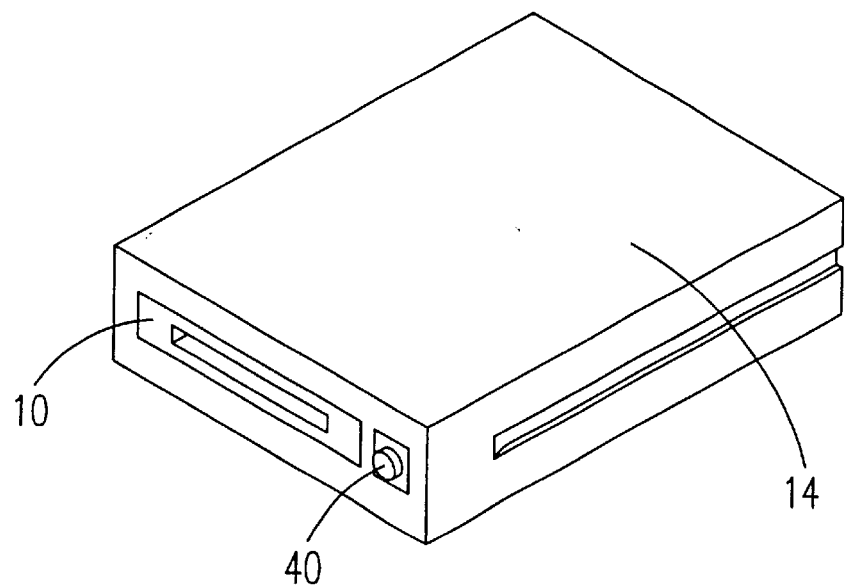
FIG. 4 is a diagram illustrating the ejector mounted on the carrying rack according to a preferred embodiment of the present invention.
Figure 5:
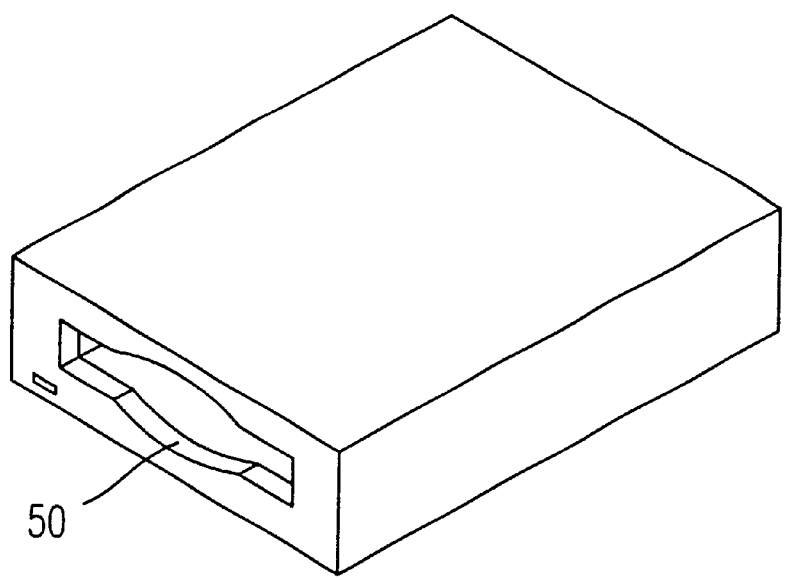
FIG. 5 is a diagram illustrating the carrying rack having the arcuate indent according to a preferred embodiment of the present invention.
Figure 7:
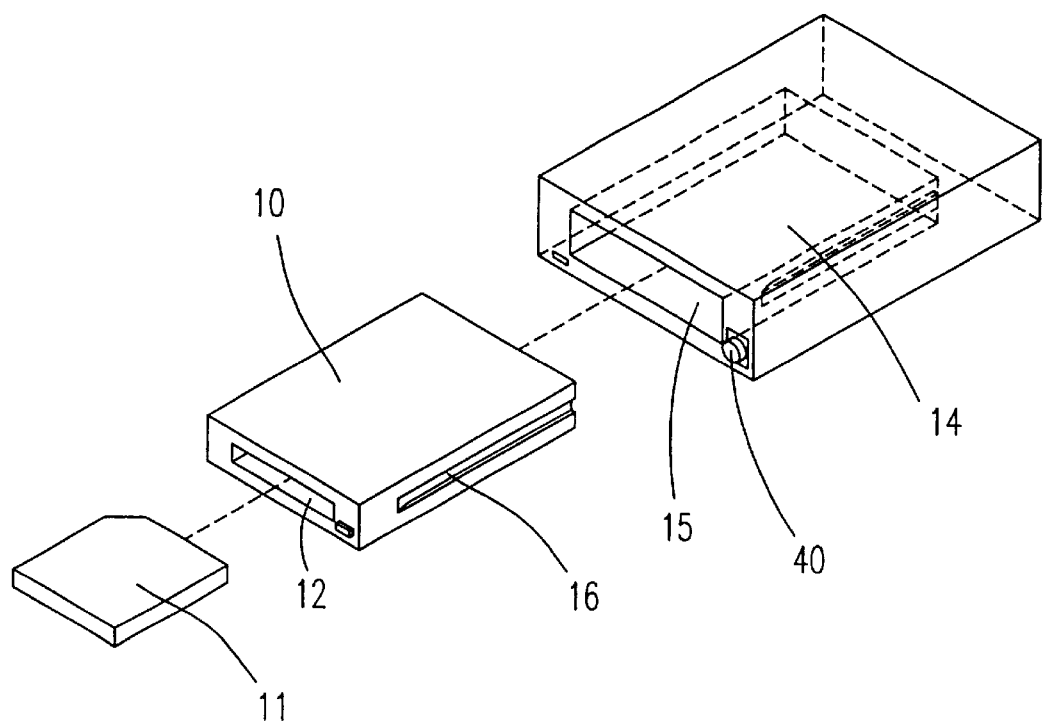
FIG. 7 is a three-dimensional diagram illustrating the mobile card reader which is built-in the host machine according to a preferred embodiment of the present invention.

Please refer to FIGS. 4 and 7. FIG. 4 is a diagram illustrating the ejector mounted on the carrying rack according to a preferred embodiment of the present invention. FIG. 7 is a three-dimensional diagram illustrating the mobile card reader which is built-in the host machine according to a preferred embodiment of the present invention. The carrying rack 14 further includes a retaining device 16 for retaining therewith the main body 10 and an ejector 40 for ejecting the main body 10. Please refer to FIG. 5. FIG. 5. is a diagram illustrating the carrying rack having the arcuate indent according to a preferred embodiment of the present invention. The ejector 40 in FIG. 4 can be changed into the arcuate indent 50 as shown in FIG. 5. The carrying rack 14 further includes an arcuate indent 50 through which a user's digit can insert to clip out the main body 10. As shown in FIG. 2, the card reader is electrically connected with the desktop computer or the notebook (not shown) via the extension cable terminal 22. Since the main body 10 of the card reader is connected with the host machine 20 via the extension line 24, the general host machine with the carrying rack 14 is also suitable for usage here.

Figure 6:
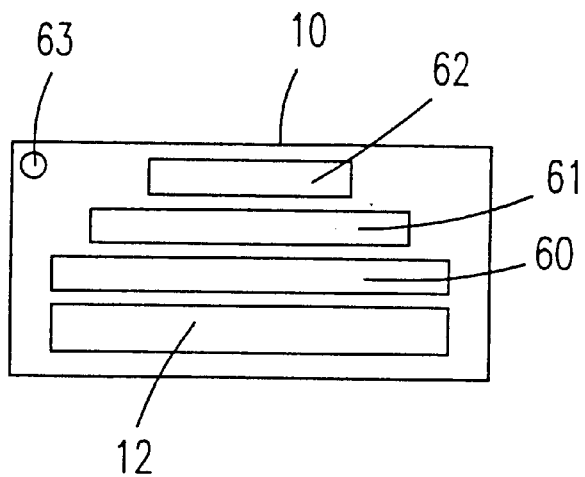
FIG. 6 is a front view illustrating the four card-placing slots of the card reader according to a preferred embodiment of the present invention.

Please refer to FIG. 6. FIG. 6 is a front view illustrating the four card-placing slots of the card reader according to a preferred embodiment of the present invention. The first memory card 11, placed in the first card-placing slot 12, is the compact flash (CF) card or the micro drive (MD) card (produced by IBM). It is shown in FIG. 6 that the second card-placing slot 60, the third card-placing slot 61, and the fourth card-placing slot 62, are able to be additionally mounted on the main body 10. In other words, the main body 10 further includes a second card-placing slot 60 for reading the smart media (SM) card. The main body 10 further includes a third card-placing slot 61 for reading the secure digital (SD) card or the multimedia (MM) card. As to Sony products, the main body 10 further includes a fourth card-placing slot 62 for reading the memory stick (MS). In conclusion, the card reader of the present invention is not limited to the usage for a single card only, such as CF, MD, SM, MS, MM, and SD. As a matter of fact, the card reader includes the usage for all kinds of memory card combination, for example, two memory cards in one card reader, three memory cards in one card reader, four memory cards in one card reader, even five in one, or six m one.

Furthermore, the main body 10 of the card reader is not used for information reading only, but also used as a writer. The carrying rack 14 has a standard size of a 3.5" floppy disk drive to be built-in the host machine 20. That is to say, the carrying rack 14 is able to be placed into the slot for the floppy disc drive 25 (the position is shown in FIG. 2). As shown in FIG. 6, the main body 10 of the card reader could be a writer and includes a light-emitting diode (LED) 63 for showing an operation status of the card reader.

According to another preferred embodiment of the present invention, the card reader separable from a host machine is provided. The main body 10 of the card reader is movable and able to be separate from the host machine 20. The card reader includes a main body 10, and a connection port 21. The main body 10 has a first card-placing slot 12 for placing therein a first memory card 11. The connection port 21 is mounted on the main body 10 for separably connecting with a plug 13. The plug 13 is electrically connected to the host machine 20 so that the card reader can separated from the host machine 20. The card reader according to one preferred embodiment further includes a carrying rack 14, which is mounted inside the host machine 20 for mounting the plug 13 and separably carrying the main body 10 of the card reader.

From the above, it is known that a completely new design of card reader is provided in the present invention. The mobile card reader provided here is able to be used in both ways of being built-in the host machine and being connected from the outside. Therefore, the application range is broader and the usage is more convenient. Besides, since the USB connection port is mounted on the main body of the card reader, the effect of separating the card reader and the host machine is enhanced. Thus, the competition of the card reader is effectively improved in the market and is suitable for industrial production.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A card reader separable from a host machine, comprising:
   a main body having a first card-placing slot for placing therein a first memory card;
   a connection port mounted on said main body for separably connecting with a plug, wherein said plug is one of an extension cable terminal and a plug fixed on a printed circuit board; and
   a carrying rack mounted inside said host machine for mounting thereon said plug and separably carrying said main body so that said card reader can be separated from said host machine,
   wherein said printed circuit board is mounted inside said carrying rack and electrically connected with a USB (universal serial bus) connector of a mother board for reading said first memory card.

2. The card reader according to claim 1, wherein said connection port is one of a group selected from a A-type port of a universal serial bus (USB), a parallel port, a firewire, of IEEE 1394 (Institute of Electrical and Electronic Engineers), and a specific interface.

3. The card reader according to claim 1, wherein said carrying rack includes a carrying room for re receiving therein said main body.

4. The card reader according to claim 3, wherein said carrying rack further includes a retaining device for retaining therewith said main body and an ejector for ejecting said main body.

5. The card reader according to claim 3, wherein said carrying rack further includes an arcuate indent through which a user's digit can insert to clip out said main body.

6. The card reader according to claim 1, wherein said card reader is electrically connected with one of a desktop computer and a notebook via said extension cable terminal.

7. The card reader according to claim 1, wherein said first memory card is one of a compact flash card and a micro drive card.

8. The card reader according to claim 1, wherein said main body further includes a second card-placing slot for reading a smart media card.

9. The card reader according to claim 1, wherein said main body further includes a third card-placing slot for reading one of a secure digital card and a multimedia card.

10. The card reader according to claim 1, wherein said main body further includes a fourth card-placing slot for reading a memory stick.

11. The card reader according to claim 1, wherein said card reader is a writer and includes a light-emitting diode (LED) for showing an operation status of said card reader.

12. The card reader according to claim 1, wherein said carrying rack has a standard size of a 3.5" floppy disk drive to be built-in said host machine.

* * * * *